United States Patent
Wobben

(10) Patent No.: US 7,589,641 B2
(45) Date of Patent: Sep. 15, 2009

(54) HAZARD NAVIGATION LIGHT FOR WIND TURBINES

(76) Inventor: Aloys Wobben, Argestrasse 19, Aurich (DE) 26607

( * ) Notice: Subject to any disclaimer, the term of this patent is extended or adjusted under 35 U.S.C. 154(b) by 122 days.

(21) Appl. No.: 10/517,130

(22) PCT Filed: Jun. 4, 2003

(86) PCT No.: PCT/EP03/05812

§ 371 (c)(1),
(2), (4) Date: Jun. 29, 2005

(87) PCT Pub. No.: WO03/104649

PCT Pub. Date: Dec. 18, 2003

(65) Prior Publication Data

US 2005/0249595 A1     Nov. 10, 2005

(30) Foreign Application Priority Data

Jun. 7, 2002     (DE)     ................. 102 25 288

(51) Int. Cl.
*G08B 5/00* (2006.01)
(52) U.S. Cl. ............... 340/815.4; 340/525; 340/964; 340/907; 340/908; 340/945; 416/5; 416/60; 416/61
(58) Field of Classification Search ............ 340/815.4, 340/825, 345, 907, 905, 908, 945, 964, 525; 416/5, 60, 61, 132 B, 132 D, 132
See application file for complete search history.

(56) References Cited

U.S. PATENT DOCUMENTS 3,737,645 A     6/1973     Kearsley
3,858,041 A     12/1974    Hitchcock ............... 240/46.53
5,980,069 A  *  11/1999    Guerrero ................. 362/360
6,379,026 B1    4/2002     Petrick
2002/0093823 A1  7/2002    Rohlfing et al.

FOREIGN PATENT DOCUMENTS

| DE | 200 08 289 U1 | 8/2000 |
| DE | 201 14 306 U1 | 1/2002 |
| JP | 11-182409 * | 7/1999 |
| JP | 2002042506 A | 2/2002 |

OTHER PUBLICATIONS

Bro, C et al. "National prøvestation for store vindmøller Vurdering af Virkningen pa Miljøet," Miljø & Energi Ministeriet, Jan. 2000, pp. 2-11.
Advisory Circular/AC 70/7460-1K "Obstruction Marking and Lighting," US Department of Transportation/Federal Aviation Administration, Mar. 2000.
Advisory Circular/AC 70/7460-1G "Obstruction Marking and Lighting," US Department of Transportation/Federal Aviation Administration, Oct. 22, 1985.
Bro, C. et al., "National testing station for large wind turbines Evaluation of the Effect on Environmental (EEE)", The Environmental and Energy Ministry Department of national planning, Jan. 2000, pp. 2-12.

* cited by examiner

*Primary Examiner*—Tai T Nguyen
(74) *Attorney, Agent, or Firm*—Seed IP Law Group PLLC

(57) ABSTRACT

A wind power installation includes a pylon and a machine housing mounted thereon. The pylon accommodates the rotor of the wind power installation and the generator for producing energy. Wind power installations can be provided with signaling devices so that the attention of air traffic is drawn to the existence of the wind power installation as a large structure. The flight lighting arrangement produces a light which is visible over a long distance, preferably a flashing light. A cover arranged with the flight lighting arrangement can substantially prevent the light from the flight lighting arrangement from being visible, from the ground, in a region around the wind power installation.

19 Claims, 3 Drawing Sheets

α > 140°

HAZARD NAVIGATION LIGHT FOR WIND TURBINES

BACKGROUND OF THE INVENTION

1. Field of the Invention

The invention concerns a wind power installation.

2. Description of the Related Art

Wind power installations have long been known. They usually consist of a number of components such as a pylon and a machine housing which is mounted thereon and which accommodates the rotor of the wind power installation and the generator connected thereto for producing energy. Whenever such wind power installations are located within air traffic zones, that is to say those regions which are directly in the relative proximity of airports, such wind power installations must be provided with certain signaling devices so that the attention of the air traffic is drawn to the existence of the wind power installation as a large structure, in good time.

Signaling devices can also be coats of paint on the rotor blades (in particular the tips thereof) of the wind power installation.

General guidelines for identifying obstacles to air travel are known from 'Nachrichten für Luftfahrer' ['News for Pilots'], Part I, NfL I 15/00, 27th Jan. 2000.

The various flight lighting arrangements are also mentioned therein. Another flight lighting arrangement is known from DE-U-200 08 289.

BRIEF SUMMARY OF THE INVENTION

In one aspect, embodiments of the invention reduce disadvantages of flight lighting arrangements.

In the wind power installation having one embodiment of a flight lighting arrangement is a flashing signaling device with a cover which prevents the flashing signaling device from being visible in a given cone (viewed from the flight lighting arrangement) laterally of the wind power installation as seen from the ground. The opposing sides of the cone can be separated by an angle of at least 45°, preferably 90°-150°, or even equal or greater than 180° (horizontal). Such a cover prevents a view of the flight lighting arrangement when the flight lighting arrangement is viewed from within a region defined by the cone around the wind power installation, but normal air traffic may still recognize the light of the flight lighting arrangement from a distance.

In one embodiment, the cover is a mirrored surface with a parabolic configuration that causes the flashing signal to appear in strengthened form and more easily visible to the air traffic.

In another aspect, an embodiment provides an advantage in that the flight lighting arrangement can substantially reduce the light pollution for a residential population in the region around the wind power installation.

Depending on the respective height of the flight lighting arrangement, an angle of 150° or more can mean that, as viewed from the ground, the light from the flight lighting arrangement is not seen at a distance of 0 to 2000 m, preferably at least up to 1000 m, from the region around wind power installation. This means that the light from the flight lighting arrangement may no longer be a burden in adjoining or nearby residential areas.

The invention is described in greater detail hereinafter by means of several embodiment.

DETAILED DESCRIPTION OF THE INVENTION

Figure 1:
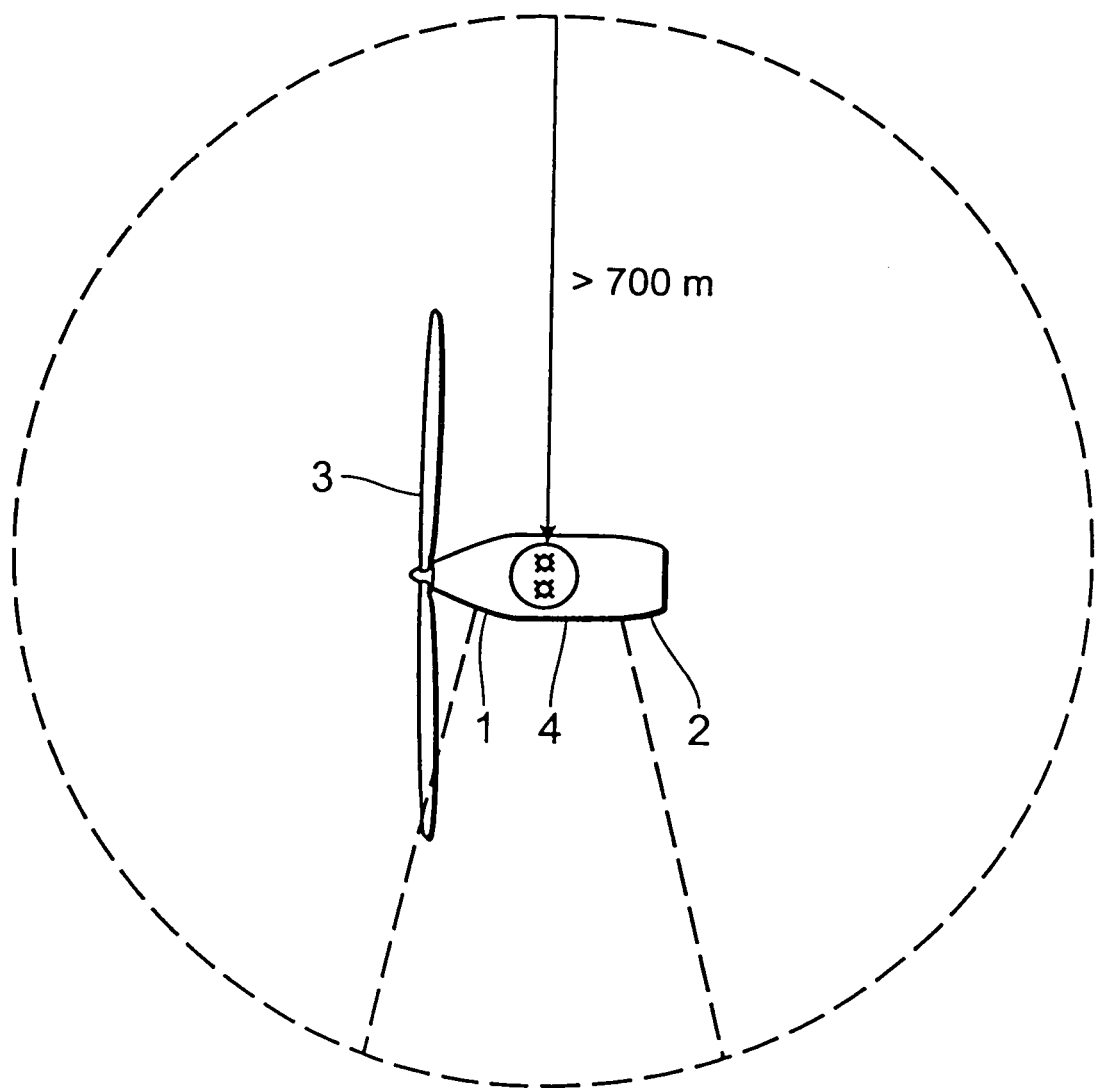
FIG. 1 shows a plan view of a wind power installation according to one embodiment of the invention.
Figure 2:
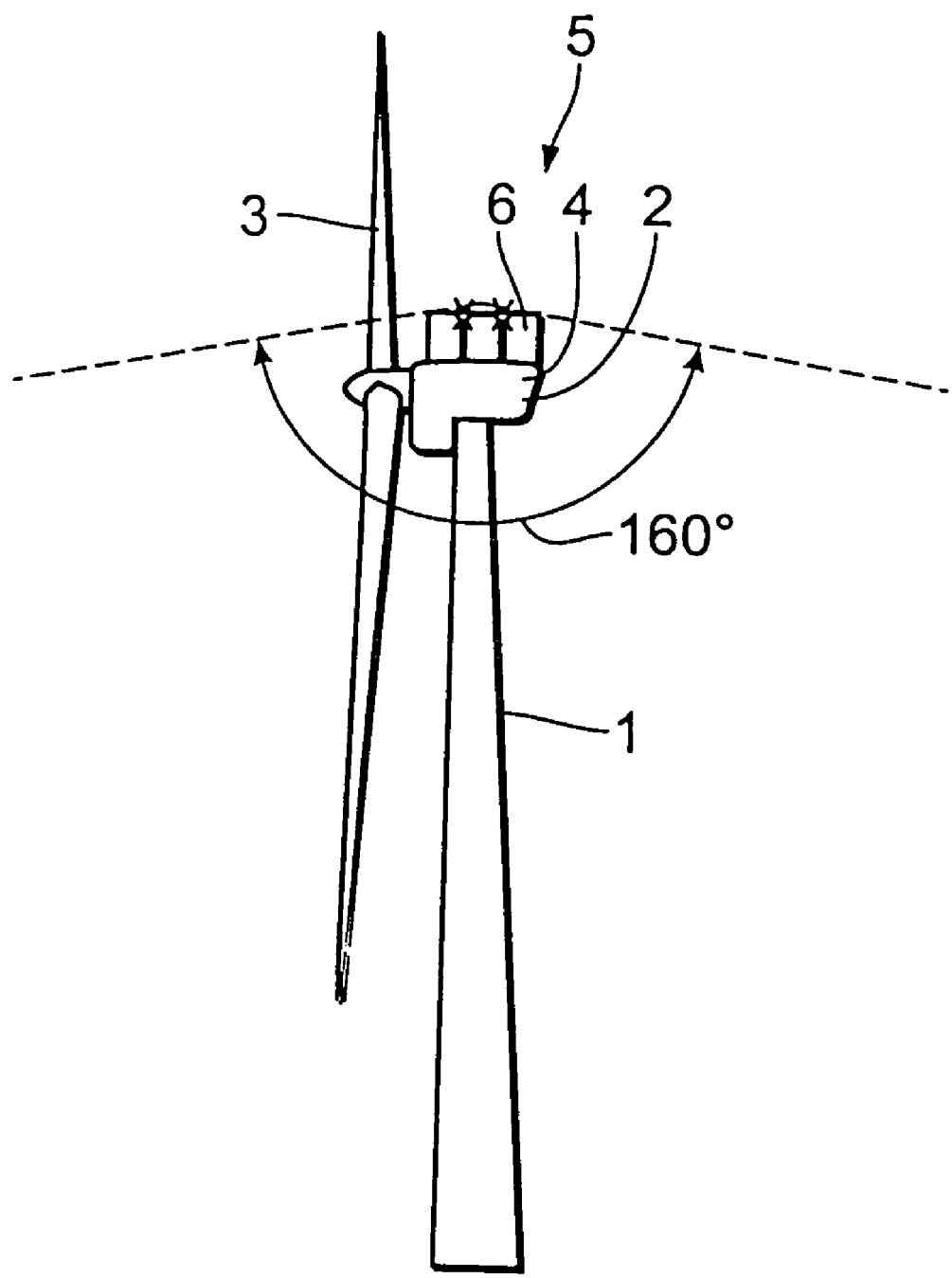
FIG. 2 shows a side view of a wind power installation according to one embodiment of the invention, and FIGS. 3a, b, c, d and e show various embodiments of a wind power installation according to the invention.
Figure 3A:
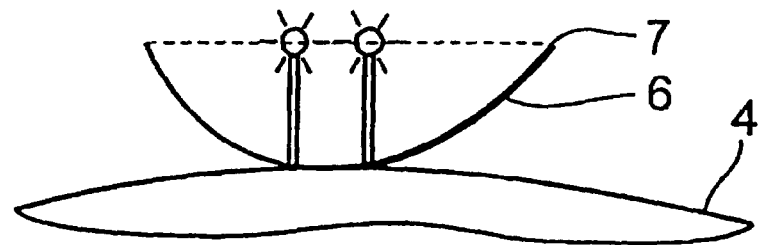
Figure 3B:
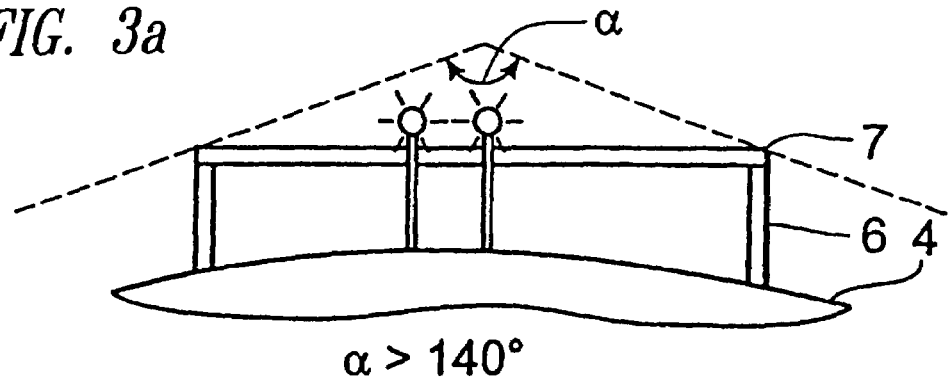

FIG. 1 shows a plan view of a wind power installation 1 comprising a pylon and a machine housing 2 mounted thereon as well as the rotor 3 of the wind power installation and the machine housing casing (pod) 4. As can be seen in FIG. 2 provided on the pod is a flight lighting arrangement 5 which is caused to flash from time to time or constantly by a suitable control (not shown). Provided below the flight lighting arrangement is a cover 6 which prevents the light of the flight lighting arrangement from being visible from the ground in a region around the wind power installation. That region can be defined by a cone diameter of, for example 2000 m, as formed on the ground around the wind power installation. In one embodiment, the light from the flight lighting arrangement cannot be seen in a region of up to about 1000 m around the wind power installation. The region around the wind power installation from which light from the flight lighting arrangement 5 is substantially blocked may vary based upon the height of the wind power installation, the shape and size of the cover 6 and/or pod 4, and the ambient light conditions at the time of viewing. The volume from which light from the lighting arrangement may not be visible, as discussed herein, may be more accurately described as a cone frustum in which the top portion of the cone is truncated (i.e., the light emitted from the flight lighting arrangement above the cover 6 is visible in the apex region of the cone and at a distance therefrom as illustrated in FIG. 3b).

Figure 3C:
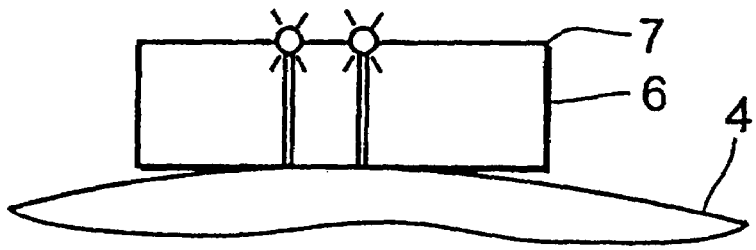
Figure 3D:
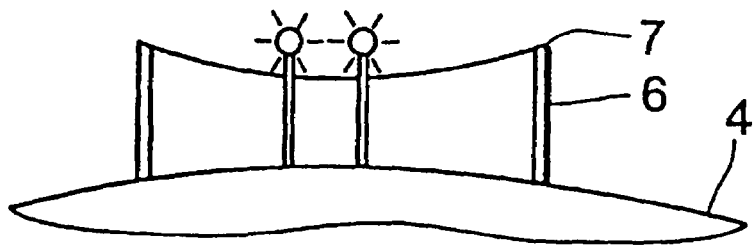
Figure 3E:
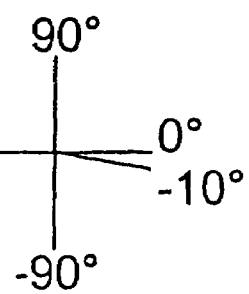

The shape of the region may correspond to a shape of the cover 6 or pod 4. For example, if the cover 6 comprises a large circular disc, then the light of the flight lighting arrangements 5 would not be visible in a conical region below the disc. Depending on the respective diameter of the disc, the covered (e.g., non-lit region) area can be larger (increase in the cone angle, as defined by an apex of the cone above the cover and illustrated in FIGS. 2 and 3b). If the cover 6 of the flight lighting arrangement 5 is parabolic in shape (FIG. 3a) or box-shaped (FIG. 3c), the cone angle can be up to 180°. A cone angle of 180° or greater may prevent the flight lighting arrangement 5 or light therefrom from being viewable from the ground. Thus, when the cone angle is less than 180°, the light from the flight lighting arrangement 5 is practically no longer visible below the slanted lines defining the sides of the cone (see FIGS. 2 and 3), with respect to the flight lighting arrangement 5. Large angles, as described, are usually unnecessary as the flight lighting arrangements 5 of the wind power installations are often located relatively high with respect to the surrounding buildings.

If the cone angle is about 160 to 170°, then the light of the flight lighting arrangement 5 may not be visible in a region of about 500-2000 m laterally of the wind power installation, but may be visible by the flight traffic.

In principle, it is possible for the cover 6 of the flight lighting arrangement 5 to be such that it is always only the same region in a given lateral region of the wind power installation that is covered. If that cover 6 is stationary or can be adjusted by motor means (upon rotation of the pod about the point of rotation), therefore, in such an embodiment, only the selected region laterally of the wind power installation that is covered, independently of an azimuth angle of the wind power installation. As FIGS. 3a-3d show, various configurations of the cover 6 can be envisaged. In that respect it is the position of the outer edge 7 of the cover 6 that determines the coverage area (i.e., cone diameter).

The higher or more extended that outer edge 7 is taken, the correspondingly greater is the cone angle and the correspondingly greater is the cone diameter of the region around the wind power installation.

The intensity of the light from the flight lighting arrangement decreases with the distance from the wind power installation, thus it may be sufficient if the cover provides a 'shadow range' of about 1500 to 3000 m, or markedly less, around the wind power installation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation positioned on a ground and having a machine housing fitted to a pylon, the machine housing including a rotor and a generator connected thereto, the wind power installation comprising:
   a flight lighting arrangement which produces a light that is visible from a distance; and
   a cover configured to substantially prevent the light from impinging on the ground in a region within approximately 2000 m around the wind power installations, independently of an azimuth angle of the wind power installation.

2. The wind power installation according to claim 1 wherein the region comprises a height of about 3 to 10 m.

3. The wind power installation according to claim 1 wherein the cover comprises a plate located beneath and/or laterally of the flight lighting arrangement.

4. The wind power installation according to claim 1 wherein the cover has a parabolic configuration, and the flight lighting arrangement is disposed within the cover.

5. The wind power installation according to claim 1 wherein the cover comprises a plate that extends laterally outward from the flight lighting arrangement.

6. The wind power installation according to claim 4 wherein the cover permits the light of the flight lighting arrangement to be visible at an angle of −10 to 90°, with respect to the horizontal.

7. A wind power installation comprising:
   a flight lighting arrangement that produces a light that alerts air traffic as to an approximate location of the wind power installation; and
   a cover positioned beneath the flight lighting arrangement that substantially blocks the light of the flight lighting arrangement from a region below the cover and in an area of more than 0 m to approximately 2000 m around the wind power installation, independently of an azimuth angle of the wind power installation.

8. The wind power installation of claim 7 wherein the light is a flashing signaling light.

9. The wind power installation of claim 8 wherein the flashing signaling light flashes from time to time.

10. The wind power installation of claim 8 wherein the flashing signaling light flashes constantly.

11. The wind power installation of claim 7 wherein the cover comprises a large circular disc.

12. The wind power installation of claim 7 wherein the cover is configured to have a parabolic shape.

13. The wind power installation of claim 7 wherein the cover is configured to have a box-shape.

14. The wind power installation of claim 7 wherein the cover includes a mirrored surface.

15. The wind power installation of claim 7 wherein the light is substantially blocked from the region below and around the wind power installation based at least in part on the size and shape of the cover.

16. The wind power installation of claim 7 wherein the region below the cover and around the wind power installation is defined by a volume corresponding to a cone frustum.

17. A wind power installation having a machine housing fitted to a pylon, the machine housing including a rotor and a generator connected thereto, the wind power installation comprising:
   a flight lighting arrangement which produces a light that is visible from a distance; and
   a cover configured to substantially prevent the light from the flight lighting arrangement from impinging on the ground in a region of more than 0 m to approximately 700 m around the wind power installation, independently of an azimuth angle of the wind power installation.

18. A wind power installation having a machine housing fitted to a pylon, the machine housing including a rotor and a generator connected thereto, the wind power installation comprising:
   a flight lighting arrangement which produces a light that is visible from a distance; and
   a cover positioned with respect to the flight lighting arrangement to permit the light from the flight lighting arrangement be visible only at an angle of approximately −10 to 90° measured from the flight lighting arrangement with respect to the horizontal, independently of an azimuth angle of the wind power installation.

19. A wind power installation comprising:
   a flight lighting arrangement that produces a light that alerts air traffic as to an approximate location of the wind power installation; and
   a cover positioned beneath the flight lighting arrangement that substantially blocks the light of the flight lighting arrangement from a region below the cover and more than 0 m to approximately 700 m around the wind power installation, independently of an azimuth angle of the wind power installation.

* * * * *

UNITED STATES PATENT AND TRADEMARK OFFICE
CERTIFICATE OF CORRECTION

| | | |
|---|---|---|
| PATENT NO. | : 7,589,641 B2 | Page 1 of 1 |
| APPLICATION NO. | : 10/517130 | |
| DATED | : September 15, 2009 | |
| INVENTOR(S) | : Wobben | |

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 122 days Delete the phrase "by 122 days" and insert -- by 549 days --

Signed and Sealed this

Twenty-seventh Day of April, 2010

David J. Kappos
*Director of the United States Patent and Trademark Office*